(12) United States Patent
Aymar

(10) Patent No.: US 8,136,567 B2
(45) Date of Patent: Mar. 20, 2012

(54) CAR TIRE ATTACHMENT MECHANISM

(76) Inventor: Brandon P. Aymar, Santee, CA (US)

( * ) Notice: Subject to any disclaimer, the term of this patent is extended or adjusted under 35 U.S.C. 154(b) by 367 days.

(21) Appl. No.: 12/625,495

(22) Filed: Nov. 24, 2009

(65) Prior Publication Data

US 2011/0120660 A1    May 26, 2011

(51) Int. Cl.
*B60C 25/122*    (2006.01)
(52) U.S. Cl. ....................................................... 157/1.24
(58) Field of Classification Search ................. 157/1.24, 157/1; 29/428
See application file for complete search history.

(56) References Cited

U.S. PATENT DOCUMENTS

| | | | | |
|---|---|---|---|---|
| 2,695,659 A | * | 11/1954 | Athmann | 157/1.24 |
| 4,324,282 A | * | 4/1982 | Leeper | 157/1.22 |
| 4,403,640 A | * | 9/1983 | Schifferly | 157/1.3 |
| 5,050,659 A | * | 9/1991 | Scalambra | 157/1.24 |
| 5,226,465 A | * | 7/1993 | Schon et al. | 157/1.28 |
| 7,497,761 B2 | * | 3/2009 | Gonzaga | 157/1.17 |
| 7,513,288 B2 | * | 4/2009 | Corghi | 157/1.17 |
| 7,556,078 B1 | * | 7/2009 | Bassett | 157/1.22 |

* cited by examiner

*Primary Examiner* — David B Thomas
(74) *Attorney, Agent, or Firm* — Richard D. Clarke

(57) ABSTRACT

This application provides a mechanism for the attachment of a tire to a unique style of car rim commonly used on, but not limited to model cars. The device consists of a base plate with a spindle for locating the tire and rim. A spring loaded spreader arm pulls the tire away from the rim creating a cavity where adhesive is placed on an upper and lower rib on the surface of the rim and on an upper and lower flat mounting surface or mating groove on the internal surface of the tire as the tire is rotated manually or rotated by means of a variable speed motor housed within the unit. The device provides a means for the process to be accomplished on both inside and outside edges of the tire and wheel rim assembly if desired.

20 Claims, 5 Drawing Sheets

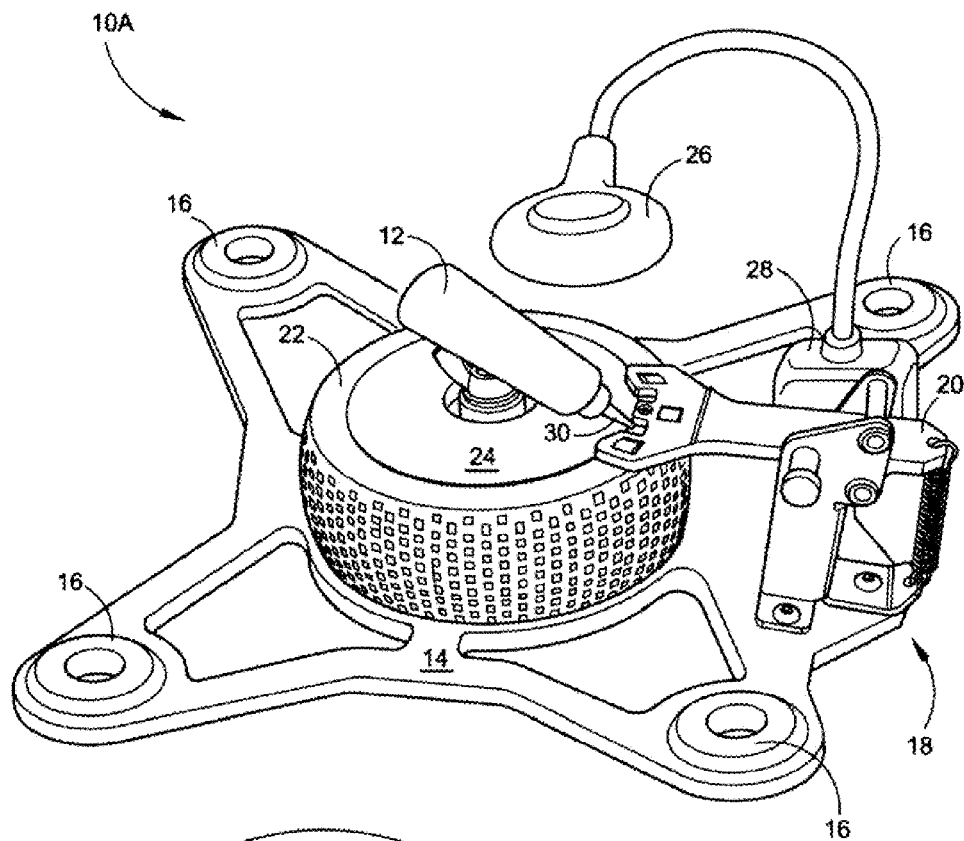
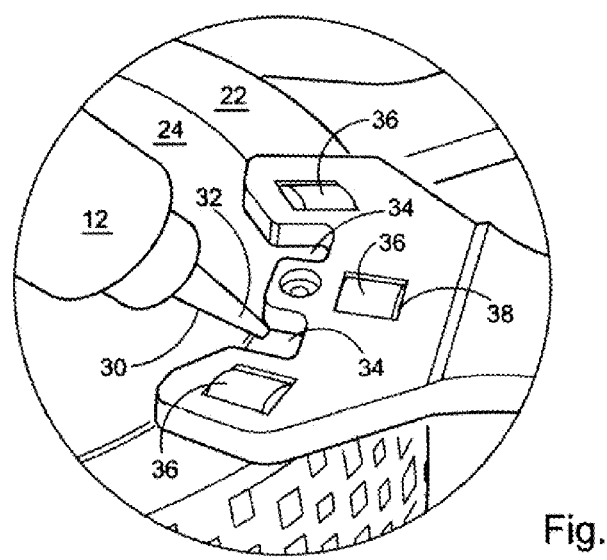
Fig. 1
Fig. 2

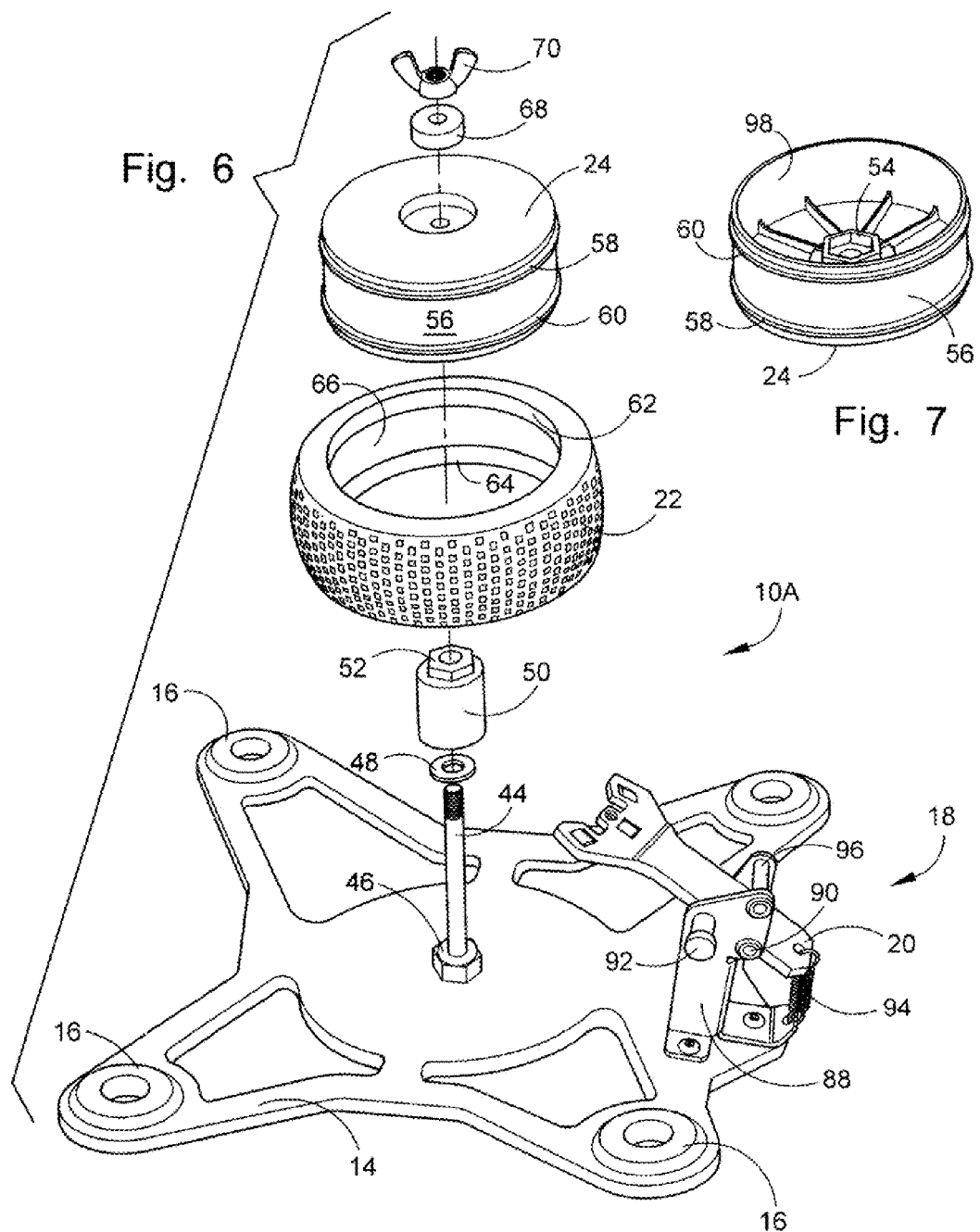

CAR TIRE ATTACHMENT MECHANISM

FIELD OF THE INVENTION

This application provides a mechanism for the attachment of a tire to a unique style of car rim commonly used on, but not limited to, model cars.

BACKGROUND OP THE INVENTION

The mounting of tires on the rims of automobiles for many years has been with the tires held on the rim by the means of the bead on the tire locking within the retaining edges on both sides of the rim and then filling the tire with air. This application is not used on model cars, because the tires are not inflated with air pressure and the tires and rims must be very lightweight.

A unique style of tire and rim combination has been developed for model cars, especially model racecars, where the tires are attached to the rims by the means of an adhesive. Typically, the tires have a flat inner mounting surface to mate with a matching configuration on the tire rim. Others have an internal groove on each side to mate with ribs of a matching configuration on the tire rim. An adhesive is required to mount the tires to the rims. With this process the tire and rim assembly can be kept extremely lightweight. Presently automobile tires are not made this way, but it must be understood that new developments are constantly being made in the automobile tire field where the car tire attachment mechanism may be applied and fall within the scope of this application.

Numerous innovations for the installation and mounting of a tire on a rim have been provided in the prior art that are described as follows. Even though these innovations may be suitable for the specific individual purposes to which they address, they differ from the present design as hereinafter contrasted. The following is a summary of those prior art patents most relevant to this application at hand; as well as a description outlining the difference between the features of the car tire attachment mechanism and the prior art.

U.S. Pat. No. 4,403,640 of Richard E. Schifferly describes an automatic or manually operated tire-mounting tool adapted primarily for mounting flexible tires on rims of various sizes and configurations. Such device is comprised of an elongated longitudinally extending working arm with two working ends for mounting and demounting purposes respectively, one end of which supports a vertically disposed rotatably mounted working roller, which roller assists in and facilitates the mounting process, and wherein said mounting arm is equipped on its mounting end with a hooked shaped positioning tong to assist in the mounting process.

This patent describes an automatic or manually operated tire-mounting tool for installing a conventional automobile tire on a rim of a full sized automobile. These tires require filling with air pressure to be operational unlike the tires that are attached to the rims by the means of an adhesive and that are not filled with pressurized air.

U.S. Pat. No. 4,324,282 of Charles G. Leeper tells of a tire changer including a base mounting a tabletop provided with wheel securing clamps. The tabletop is mounted on the base for movement between tire changing positions and a generally vertical wheel loading and unloading position. The tabletop is provided with a tire changing tool driving fixture and a tool is receivable in the fixture and includes a head for engaging a tire bead for changing positions and a tire support surface spaced from the tool head for supporting a tire during the initial stages of a mounting operation eliminating any need for the operator of the changer to provide such support.

This patent tells of a tire changer for full sized automobile tires that could not be adapted to the operation of inserting the adhesive on the flat inner mounting surface or within the internal grooves, depending upon tire type and configuration, of the unique style tire and rim assembly.

U.S. Pat. No. 7,497,761 of Tullio Gonzaga relates to a tire assembling-disassembling tool for use in a tire assembling-disassembling machine arranged to rotatable support a tired wheel or wheel rim, said tool being cantilever supported on a respective guide member of the tire assembling-disassembling machine, said tool extending parallel to the axis of rotation of the wheel and comprising a tool-carrying arm slidably mounted on said guide member, and at least one nail-shaped member having a first end thereof constrained to said supporting arm so to be able to made roto-translational movements with respect thereto, and the other free end hook-shaped with back facing said wheel rim.

This patent relates to a tire assembling-disassembling tool for use in a tire assembling-disassembling machine. This again is a machine designed for the use on conventional automobile tires and would not work with tires that are attached to the rims by the means of an adhesive and are not filled with pressurized air.

U.S. Pat. No. 7,153,288 of Rimo Corghi describes a tool for mounting a tire onto a rim, suitable for making it easier to insert the bead of the tire under the bead-stopping edge of the rim and inside the channel of the rim itself; said tools comprises a body equipped with a fixed jaw and with a mobile jaw to which actuation means are operatively connected suitable for taking said mobile jaw closer to said fixed jaw to lock said body to the edge of the rim, a base intended to be rested on the sidewall of the tire being associated with said body, said base being fixedly connected to said body so as to be able to oscillate towards the axis of the rim to make it easier to insert the bead inside the bead-stopping edge of the rim.

This patent describes a tool for mounting a tire onto a rim, suitable for making it easier to insert the bead of the tire under the bead-stopping edge of the rim. This tool working with a tire with a bead would not work with a tire with flat inner mounting surfaces or internal grooves.

U.S. Pat. No. 7,556,078 of David Robert Bassett discloses a tool for completing the mounting of a bicycle tire onto its rim that is superior to those provided by the tools of the prior tire irons. The use of a tool is usually required to complete the job of mounting a bicycle tire to its rim due to the high tension developed in the bead of the tire at that stage. The present invention does not rely on a levering arrangement at all, but instead employs a traveling inclined plane to progressively lift the tire bead to a height above the rim's edge, and a downwardly sloped incline to allow the so lifted bead to then slide down into the rim's interior. The invention utilizes the flange, or rim sidewall, of the wheel rim for both support and guidance as it is impelled forward on the rim by impacts on its trailing surface from an object suitable for the function, such as a hammer. A slot is incorporated into the invention to receive the wheel's flange.

This patent discloses a tool for completing the mounting of a bicycle tire onto its rim and could not work in the operation of inserting the adhesive within the flat inner mounting surfaces or internal grooves of the unique style tire and rim assembly.

None of these previous efforts, however, provides the benefits attendant with the car tire attachment mechanism and could not be adapted to working on the tires of model cars. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the car tire attachment mechanism in detail it is to be understood that the design is not limited in its application to the details of construction and to the arrangement, of the components set forth in the following description or illustrated in the drawings. The car tire attachment mechanism is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present design. It is important, therefore, that the claims be regarded as including such equivalent construction insofar as they do not depart from the spirit and scope of the present application.

SUMMARY OF THE INVENTION

The principal advantage of the car tire attachment mechanism is creating a convenient method of placing the adhesive between the rib of the tire rim and the flat inner mounting surfaces or internal groove in the tire when mounting a tire on the rim of a car.

Another advantage of the car tire attachment mechanism is that it pulls the tire away from the rim just enough to insert the tip of the adhesive applicator, and more importantly to be able to observe the amount of glue applied, in order to control the amount of glue being used to attach each tire.

Another advantage of the car tire attachment mechanism is that with the pin that pulls the tire away from the rim on a bearing it allows the pin to roll with the movement of the tire, a minimum amount of friction is exerted on the tire and rim as the adhesive is applied.

Another advantage of the car tire attachment mechanism is that the spring loaded spreader arm is automatically locked into operational position via a spring-loaded pull knob, then the spring-loaded spreader arm automatically moves out of the way for easy removal of the tire assembly.

A further advantage of the car tire attachment mechanism is having the tire continually pulled away from the rim as it is rotated while a constant pressure is maintained on the adhered surface.

Yet another advantage of the car tire attachment mechanism is that it will work with a variety of sizes of car tires using this unique mounting design.

And still another advantage of the car tire attachment mechanism is that it will work manually as well as being driven by the means of a variable speed motor.

These together with other advantages of the car tire attachment mechanism, along with the various features of novelty, which characterize the design, are pointed out with particularity in the claims annexed to and forming a part of this disclosure. For a better understanding of the car tire attachment mechanism, its operating advantages and the specific objects attained by its uses, reference should be made to the accompanying drawings and descriptive matter in which there are illustrated preferred embodiments of the car tire attachment mechanism. There has thus been outlined, rather broadly, the more important features of the design in order that the detailed description thereof that follows may be better understood, and in order that the present contribution to the art may be better appreciated. There are additional features of the car tire attachment mechanism that will be described hereinafter and which will form the subject matter of the claims appended hereto.

The manual car tire attachment mechanism is mounted on a base plate with four grommet cushion units at the corners. A spreader assembly is mounted on one side of the base plate with the spring-loaded spreader arm pulling the tire away from the wheel rim as the tire is manually rotated in a clockwise or counter-clockwise direction. A round pin used to pull the tire away from the rim at the distal end of the spring-loaded spreader arm rotates on a bearing as the tire is pulled away from the rim, minimizing the friction on the tire as the tire and rim are rotated. Three roller bearings on roller pins support the spring loaded spreader arm against the tire, additionally minimizing the friction on the tire and rim. Two cavities on either side of the round pin on the spring-loaded spreader arm provide the area required as the tire is pulled away from the rim for the application of the adhesive. An adhesive applicator tip is inserted into one of these adhesive cavities and adhesive is applied as the tire and rim are rotated. A spindle locked in position by the means of a locking nut, washer and long spacer are located on the spindle beneath the tire and wheel rim. The long spacer has a hexagonal upper section that mates with a matching hexagonal depression on the inside of the wheel rim. The wheel rim outer surface has an upper rib and a lower rib that mate with the flat upper mounting surface or lower groove on the inside surface of the tire. Above the wheel rim will be the short spacer held down on the spindle by the means of a wing nut. The spreader assembly consists of a base section with a pivot pin allowing the spring-loaded spreader arm to move up and down. A locking pin holds the spring-loaded spreader arm in the down position against the tension exerted by the means of the spring. By releasing the locking pin the spring-loaded spreader arm will rise to the upright position. A stop pin is located on the base section to be used as a stop for the spring-loaded spreader arm in the upright position.

The motorized car tire attachment mechanism will be of the similar configuration except that the wheel rim will be mounted on a drive spindle powered by the means of a variable speed motor.

With respect to the above description then, it is to be realized that the optimum dimensional relationships for the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the car tire attachment mechanism. Further, since numerous modifications and changes will readily occur to those skilled in the art, it is not desired to limit the design to the exact construction and operation shown and described, and accordingly, all suitable modifications and equivalents may be resorted to, falling within the scope of this application.

BRIEF DESCRIPTION OF THE DRAWINGS

The accompanying drawings, which are incorporated in and form a part of this specification, illustrate embodiments of the car tire attachment mechanism and together with the description, serve to explain the principles of this application.

FIG. 1 depicts a perspective view of the car tire attachment mechanism illustrating the location of the adhesive applicator and an optional lamp attachment.

FIG. 2 depicts an enlarged perspective view of the tip of the adhesive applicator being inserted into the adhesive cavity between flat inner mounting surface or the groove in the tire and the rib on the wheel rim.

FIG. 6 depicts an exploded perspective view of the car tire attachment mechanism.

FIG. 7 depicts a perspective view of the underside of the tire rim.

Figure 3:
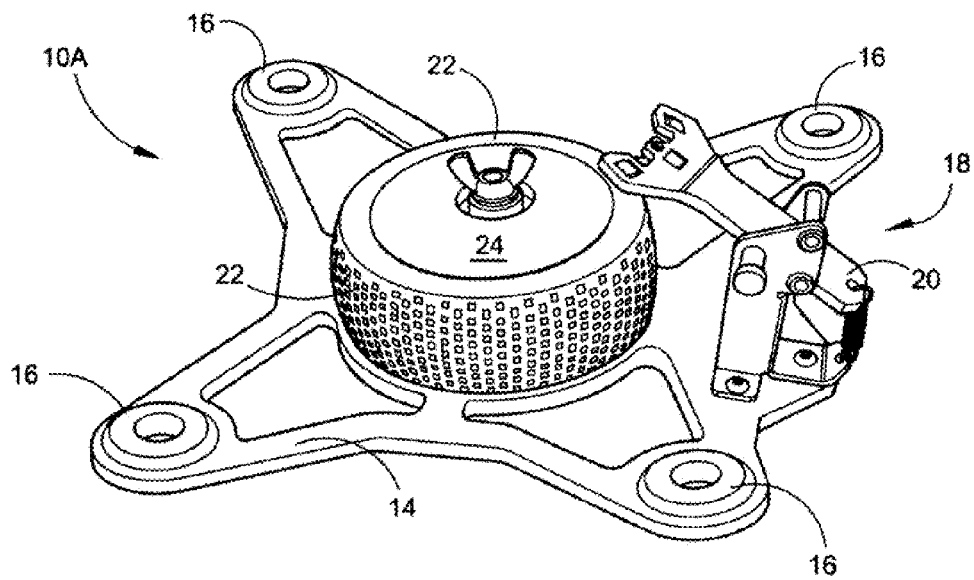
FIG. 3 depicts a perspective view of the car tire attachment mechanism illustrating the location of the spreader arm in the raised position for the easy insertion and removal of the wheel assembly.

For a fuller understanding of the nature and advantages of the car tire attachment mechanism, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Referring now to the drawings, wherein similar parts of the car tire attachment mechanism 10A and 10B are identified by like reference numerals, there is seen in FIG. 1 a perspective view of the manual car tire attachment mechanism 10A illustrating the location of the adhesive container 12 and adhesive applicator tip 30. The car tire attachment mechanism 10A is mounted on a base plate 14 with four grommet cushion units 16 at the corners. A spreader assembly 18 is mounted on one side of the base plate 14 with the spring loaded spreader arm 20 pulling the tire 22 away from the wheel rim 24 as the tire 22 is manually rotated in a clockwise direction. An optional lamp 26 and power unit 28 may be attached to the base plate 14 to illuminate the process.

FIG. 2 depicts an enlarged perspective view of the adhesive applicator tip 30 of the adhesive container 12 illustrating the adhesive applicator dispensing tip 32 being inserted into the adhesive cavity 34 between the tire 22 and wheel rim 24. The spring loaded spreader arm 20 will include one or more pressure surfaces to make contact under pressure against the tire. Here these pressure surfaces are shown as one or more roller bearings, here illustrated as three roller bearings 36 on roller pins 38 support of the spring-loaded spreader arm 20 against the tire 22, additionally minimizing the friction on the tire 22 and wheel rim 24. The pressure surfaces could be simple humps in a plastic molded version of the spring loaded spreader arm 20, or they could be simply flat pressure contact surfaces thereon.

Figure 4:
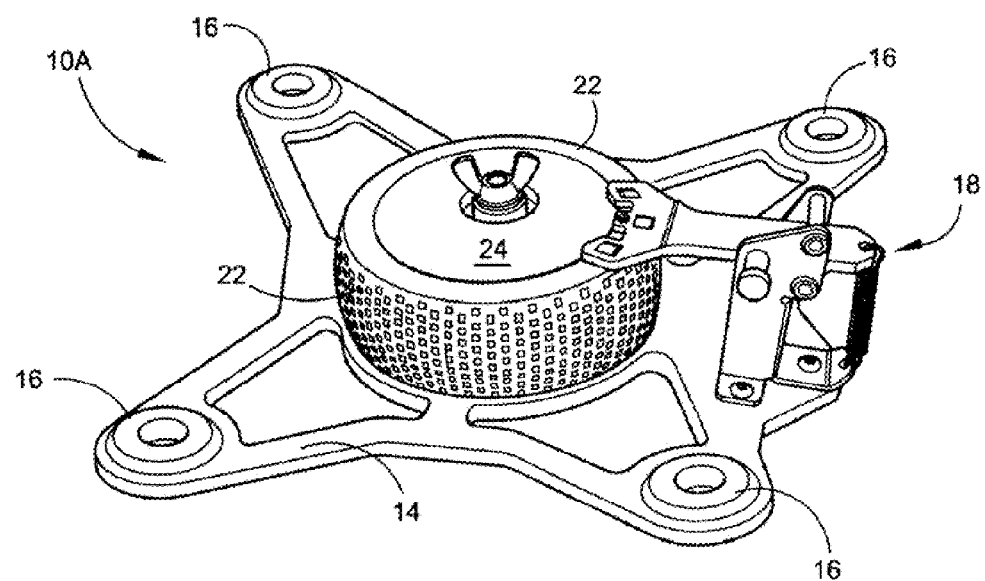
FIG. 4 depicts a perspective view of the car tire attachment mechanism illustrating the location of the spreader arm in the lowered position.

FIG. 3 depicts a perspective view of the manual car tire attachment mechanism 10A illustrating the location of the spring loaded spreader arm 20 in the raised position for the easy insertion and removal of the wheel rim 24 and tire 22 assembly. FIG. 4 depicts a perspective view of the car tire attachment mechanism 10A illustrating the location of the spring-loaded spreader arm 20 in the lowered position.

Figure 5:
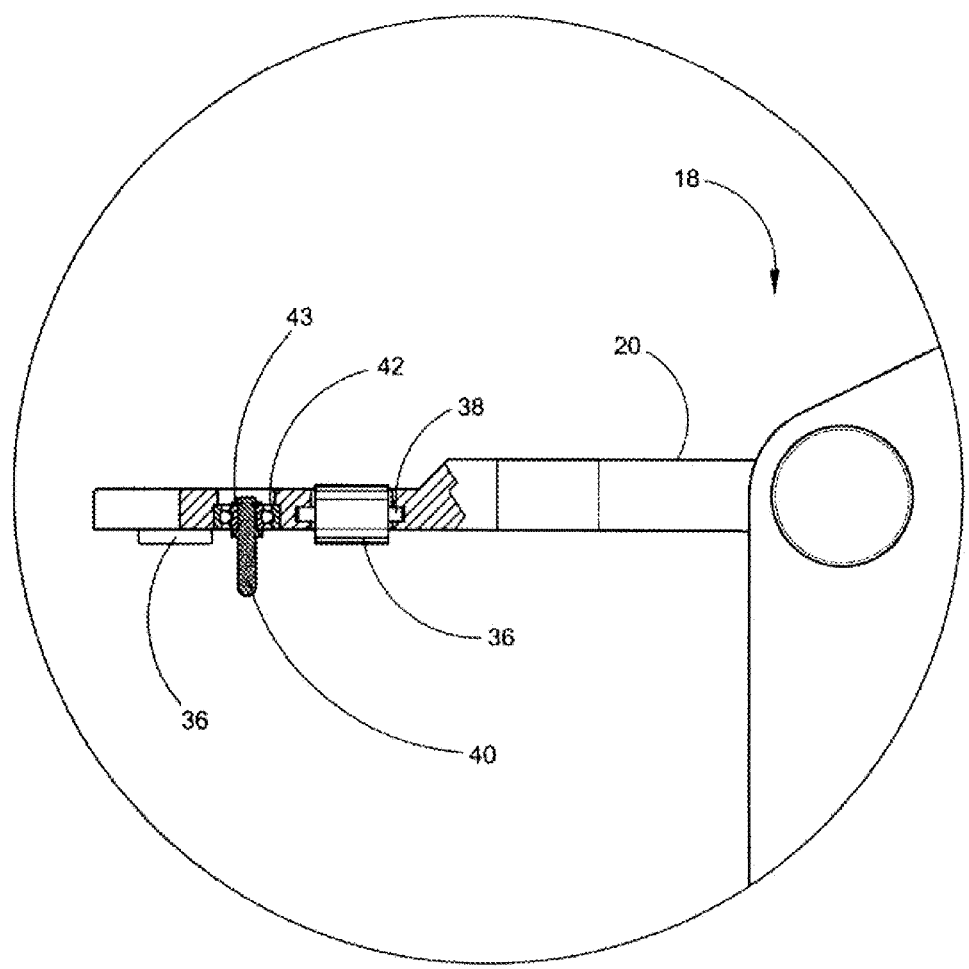
FIG. 5 depicts a cross section side view of the distal end of the spring-loaded spreader arm.

FIG. 5 depicts a cross section side view of the distal end of the spring-loaded spreader arm 20 illustrating the position of the central roller bearing 36 with the roller pin 38. The round spreader pin 40 used to pull the tire 22 away from the wheel rim 24 at the distal end of the spring-loaded spreader arm 20 rotates on a bearing 42 as the tire is pulled away from the wheel rim 24, minimizing the friction on the tire 22 as the tire and rim are rotated. The round spreader pin 40 is held in position in the bearing 42 by the means of a snap ring 43. The roller bearings 36 deliver downward pressure onto the tire face against and inward to the wheel rim 24 to force a good quality and uniform glue application and to prevent the tire face from coming off the wheel rim (or bead) during the gluing operation. Additionally, the round spreader pin 40 acts to temporarily separate the tire from the wheel rim while glue is being applied, and more importantly allows clear observation of the glue application to control glue application, that is, to control the amount of glue being applied.

FIG. 6 depicts an exploded perspective view of the manual car tire attachment mechanism 10A illustrating the base plate 14 with the four grommet cushion units 16 having a spindle 44 locked in position by the means of a locking nut 46. A washer 48 and long spacer 50 are located on the spindle 44 beneath the tire 22 and wheel rim 24. The long spacer 50 has a hexagonal upper section 52 that mates with a matching hexagonal depression 54 illustrated in FIG. 7. The wheel rim 24 outer surface 56 has an upper rib 58 and a lower rib 60 that mate with the upper flat mounting surface 62 and lower flat mounting surface 64 on the inside surface 66 of the tire 22. Above the wheel rim 24 will be placed the short spacer 68 held down on the spindle 44 by the means of a wing nut 70. The spreader assembly 18 consists of a base section 88 with a pivot pin 90 allowing the spring-loaded spreader arm 20 to move up and down. Locking pin 92 holds the spring-loaded spreader arm 20 in the down position against the tension exerted by the means of the spring 94. By releasing the locking pin 92, the spring-loaded spreader arm 20 will rise to the upright position. A stop pin 96 is located on the base section 88 to be used as a stop for the spring-loaded spreader arm 20 in the upright position.

FIG. 7 depicts a perspective view of the underside of the tire rim 24 illustrating the hollow inner cavity 98 with the upper rib 58 and the lower rib 60 on the outer surface 56. By rotating the wheel rim 24 and tire 22 and repositioning the long spacer 50 and the short spacer 68 on the spindle 44 the adhesive process may be performed on the opposite side of the tire 22 and wheel rim 24.

Figure 8:
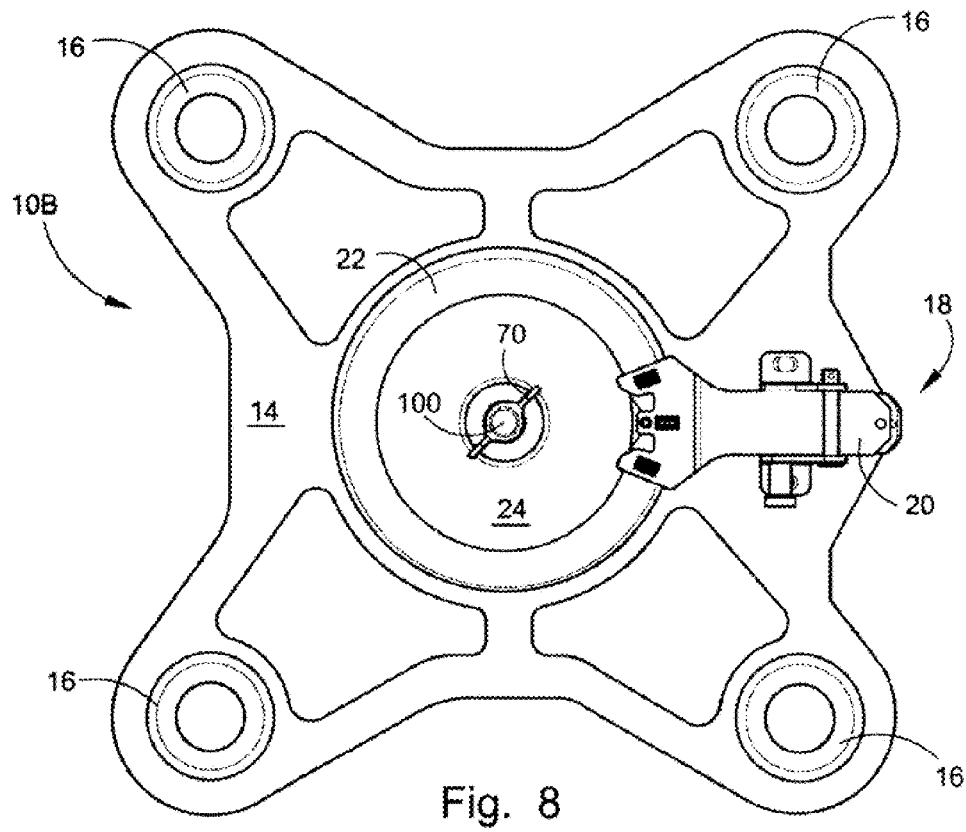
FIG. 8 depicts a top plan view of the motorized car tire attachment mechanism.
Figure 9:
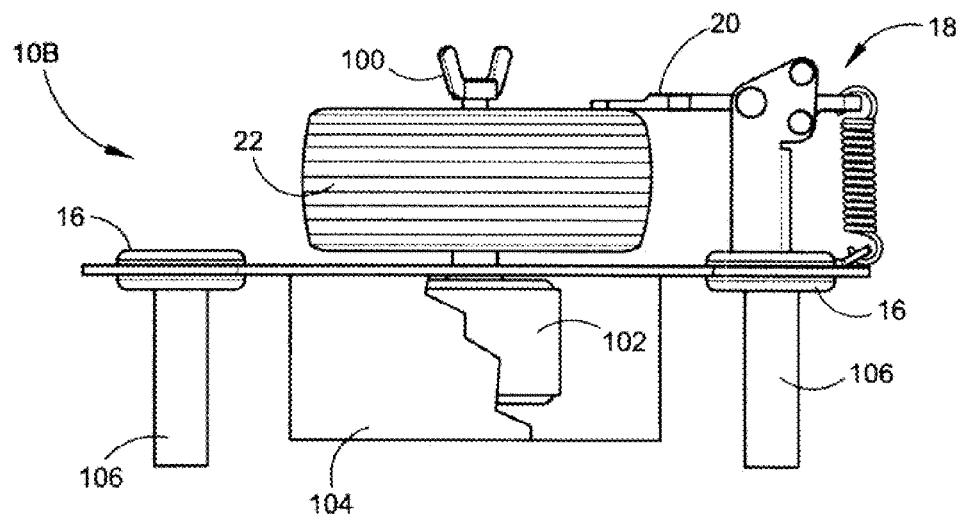
FIG. 9 depicts a side view of the motorized car tire attachment mechanism incorporating a variable speed drive motor.

FIG. 8 depicts a top plan view of the motorized car tire attachment mechanism 10B incorporating the same base plate 14 with the tire 22 and wheel rim 24 attached to a drive spindle 100 powered by the means of a variable speed motor 102 illustrated in FIG. 8. The same spreader assembly 18 will be used in both the motorized and manual applications. FIG. 9 depicts a side view of the motorized car tire attachment mechanism 10B incorporating a variable speed drive motor 102 enclosed in a motor housing box 104 below the base plate 14. Legs 106 are inserted into the four grommet cushion units 16 to elevate the base plate 14 above the motor housing box 104.

The car tire attachment mechanisms 10A and 10B shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a car tire attachment mechanisms 10A and 10B in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A car tire attachment mechanism comprising:
   a) a base plate supporting a spindle used for securing a wheel rim in a rotationally moveable fashion;
   b) a spring loaded spreader arm mounted to said base plate via a spreader arm assembly base wherein said spreader arm includes a proximal end and a distal end;
   c) one or more pressure surfaces and a round spreader pin housed within said proximal end of said spring loaded spreader arm and a spring attached to said distal end of said spreader arm; and
   d) a pivot pin a locking pin and a stop pin affixed to said spreader arm assembly base;
   whereby when said spring loaded spreader arm is lowered into operational position said locking pin secures said spreader arm in the lower operational position, and when said locking pin is released said spreader arm is raised through the action of said spring.

2. The car tire mechanism according to claim 1, wherein said one or more pressure surfaces include one or more roller bearings.

3. The car tire mechanism according to claim 2, wherein said one or more roller bearings are rotationally mounted on said proximal end of said spring loaded spreader arm and in operation apply pressure to the tire being glued to insure uniform glue application and immediate contact between the wheel rim and tire following glue application.

4. The car tire mechanism according to claim 1, wherein said spindle used for securing a wheel rim in a rotationally moveable fashion is free-spinning and the user manually rotates a wheel rim secured to said spindle.

5. The car tire mechanism according to claim 1, wherein said spindle used for securing a wheel rim in a rotationally moveable fashion is attached to a motor and the motor is used to rotate a wheel rim secured to said spindle.

6. The car tire mechanism according to claim 5, wherein said motor is housed beneath said base plate and enables motorized rotation of said spindle.

7. The car tire mechanism according to claim 1, wherein said proximal end of said spring loaded spreader arm forms an adhesive application cavity to accept the dispensing tip of an adhesive applicator container.

8. The car tire mechanism according to claim 1, wherein said round spreader pin housed within said proximal end of said spring loaded spreader arm, when lowered into operational position, and when the tire is rotated, temporarily separates the wheel rim from the tire to allow for application of glue between the wheel rim and tire.

9. The car tire mechanism according to claim 1, wherein said round spreader pin housed within said proximal end of said spring loaded spreader arm, when lowered into operational position, and when the tire is rotated, temporarily separates the wheel rim from the tire to allow for the observation of the application of glue between the wheel rim and tire, in order to control the application of glue.

10. The car tire mechanism according to claim 1, wherein said spindle further includes a locking nut, a long spacer, a short spacer and a wing nut for securing a wheel rim to said spindle in a rotational fashion, and further wherein said long spacer further includes a hexagonal upper section.

11. A method for making a tire attachment mechanism, comprising the steps of:
   a) providing a base plate supporting a spindle used for securing a wheel rim in a rotationally moveable fashion;
   b) providing a spring loaded spreader arm mounted to said base plate via a spreader arm assembly base wherein said spreader arm includes a proximal end and a distal end;
   c) providing one or more pressure surfaces and a round spreader pin housed within said proximal end of said spring loaded spreader arm and a spring attached to said distal end of said spreader arm; and
   d) providing a pivot pin a locking pin and a stop pin affixed to said spreader arm assembly base;
   whereby when said spring loaded spreader arm is lowered into operational position said locking pin secures said spreader arm in the lower operational position, and when said locking pin is released said spreader arm is raised through the action of said spring.

12. The method for making a tire attachment mechanism, according to claim 11, wherein said step of providing one or more pressure surfaces further includes providing one or more roller bearings.

13. The method for making a tire attachment mechanism, according to claim 11, wherein said step of providing a base plate supporting a spindle used for securing a wheel rim in a rotationally moveable fashion further includes providing a spindle which is free-spinning and the user manually rotates a wheel rim secured to said spindle.

14. The method for making a tire attachment mechanism, according to claim 11, wherein said step of providing a base plate supporting a spindle used for securing a wheel rim in a rotationally moveable fashion further includes providing a spindle which is attached to a motor and the motor is used to rotate a wheel rim secured to said spindle and further wherein said motor is housed beneath said base plate and enables motorized rotation of said spindle.

15. The method for making a tire attachment mechanism, according to claim 11, wherein said step of providing a spring loaded spreader arm further includes providing a spring loaded spreader arm wherein said proximal end of said spring loaded spreader arm forms an adhesive application cavity to accept the dispensing tip of an adhesive applicator container.

16. The method for making a tire attachment mechanism, according to claim 12, wherein said step of providing one or more roller bearings further includes providing one or more roller bearings wherein said one or more roller bearings are rotationally mounted on said proximal end of said spring loaded spreader arm and in operation apply pressure to the tire being glued to insure uniform glue application and immediate contact between the wheel rim and tire following glue application.

17. The method for making a tire attachment mechanism, according to claim 11, wherein said step of a round spreader pin housed within said proximal end of said spring loaded spreader arm further includes a round spreader pin housed within said proximal end of said spring loaded spreader arm wherein said round spreader pin housed within said proximal end of said spring loaded spreader arm, when lowered into operational position, and when the tire is rotated, temporarily separates the wheel rim from the tire to allow for application of glue between the wheel rim and tire.

18. The method for making a tire attachment mechanism, according to claim 11, wherein said step of a round spreader pin housed within said proximal end of said spring loaded spreader arm further includes a round spreader pin housed within said proximal end of said spring loaded spreader arm wherein said round spreader pin housed within said proximal end of said spring loaded spreader arm, when lowered into operational position, and when the tire is rotated, temporarily separates the wheel rim from the tire to allow for the observation of the application of glue between the wheel rim and tire, in order to control the application of glue.

19. The method for making a tire attachment mechanism, according to claim 11, wherein said step of providing a base plate supporting a spindle used for securing a wheel rim in a rotationally moveable fashion further includes providing a base plate supporting a spindle used for securing a wheel rim in a rotationally moveable fashion wherein said spindle further includes a locking nut, a long spacer, a short spacer and a wing nut for securing a wheel rim to said spindle in a rotational fashion, and further wherein said long spacer further includes a hexagonal upper section.

20. The method for using a tire attachment mechanism, comprising the steps of:
   a) mounting a tire to a wheel rim and securing said wheel rim to a spindle supported by a base plate;
   b) lowering a spring loaded spreader arm assembly having one or more pressure surfaces and a spreader pin attached thereto, whereby said pressure surfaces apply uniform pressure to the tire forcing it uniformly against the wheel rim, and further wherein said spreader pin creates an opening between the tire and wheel rim where said spreader pin contacts the tire;
   c) placing an adhesive applicator dispensing tip into an opening formed within said spreader arm assembly such that when the wheel rim is rotated on said spindle, glue is applied in a uniform fashion to the wheel rim within the gap formed by said spreader pin; and
   d) continuing to rotate the wheel rim allows glue to be applied to the entire wheel rim and tire interface, then raising said spring loaded spreader arm assembly and removing the fully glued tire and wheel rim from said spindle.

* * * * *